United States Patent [19]

McClaflin et al.

[11] 3,730,275

[45] May 1, 1973

[54] METHOD USING LOW FRICTION LOSS LIQUID COMPOSITION HAVING RESISTANCE TO SHEAR DEGRADATION

[75] Inventors: Gifford G. McClaflin; Dennis J. Royer, both of Ponca City, Okla.

[73] Assignee: Continental Oil Company, Ponca City, Okla.

[22] Filed: Feb. 16, 1971

[21] Appl. No.: 115,867

[52] U.S. Cl. ..................166/308, 137/13, 166/307
[51] Int. Cl. ......................E21b 43/26, F15d 1/02
[58] Field of Search ..................166/308, 307, 305 R, 166/275; 137/13; 252/8.3, 8.55 R

[56] References Cited

UNITED STATES PATENTS

| | | | |
|---|---|---|---|
| 3,215,154 | 11/1965 | White et al. | 252/8.55 R X |
| 3,606,899 | 9/1971 | Scott | 137/13 |
| 3,102,548 | 9/1963 | Smith et al. | 137/13 |
| 3,254,719 | 6/1966 | Root | 166/308 |
| 3,351,079 | 11/1967 | Gibson | 137/13 |
| 3,375,872 | 4/1968 | McLaughlin et al. | 166/308 UX |
| 3,434,485 | 3/1969 | Lummus | 137/13 |
| 3,483,121 | 12/1969 | Jordan | 166/308 X |
| 3,520,313 | 7/1970 | Seymour | 166/308 X |
| 3,542,044 | 11/1970 | Hansen | 166/308 X |
| 3,559,664 | 2/1971 | Seymour | 252/8.55 R |

*Primary Examiner*—Stephen J. Novosad
*Attorney*—Joseph C. Kotarski, Henry H. Huth, Robert B. Coleman, Jr. and Gerald L. Floyd

[57] ABSTRACT

A method of reducing the shear degradation when pumping through conduits, such as well tubing during hydraulic fracturing operations and pipelines, a liquid containing a friction loss reducing additive comprising adding to the liquid the friction loss reducing additive at least partially in chunk or granular form so that the additive is present at least partially in chunk or granular form when the mixture is passed through the pump.

5 Claims, No Drawings

3,730,275

METHOD USING LOW FRICTION LOSS LIQUID COMPOSITION HAVING RESISTANCE TO SHEAR DEGRADATION

Background of the Invention

1. Field of the Invention

The present invention relates to liquid compositions having reduced friction loss when passed through conduits. More particularly the invention concerns such compositions having decreased shear degradation.

2. Description of the Prior Art

Energy must be supplied to move a liquid from one location to another via a conduit or pipe. When a liquid is pumped through a conduit a pressure is developed on the positive or discharge side of the pump. The pressure in the conduit immediately adjacent the discharge side of the pump will be greater than the pressure farther along the conduit away from the pump. This difference in pressure, often referred to as the "pressure drop," "friction loss," or "drag," is generally more pronounced the faster the liquid flows. In many industrial operations where a large volume of liquid is moved rapidly, such as in the hydraulic fracturing of subterranean formations penetrated by a well and the transportation of liquids long distances through pipelines, a large amount of energy is expended in moving the liquid. If the pressure drop could be reduced, either larger volumes of liquid could be moved with the same pump capacity or the pressure and/or energy requirements for moving a given liquid volume reduced. Additives are known which reduce the friction loss or drag of liquids flowing through pipes. For aqueous base liquids such additives include gums such as guar gum, hydroxy-ethyl cellulose, polyethylene oxide, polyacrylamide, polyethylene oxide, hydrolyzed polyacrylamide and copolymers of acrylamide and methylenebisacrylamide. For oil base liquids such additives include polymers such as polyisobutylene and copolymers of ethylene and a higher molecular weight alpha olefin.

Generally these additives are added to the base liquid as finely particulated solids which readily dissolve or disperse in the liquid. Alternatively, the additives are first added to some solvent to form a concentrated solution of the additive which readily dissolves in the base liquid.

Many friction loss control additives work well as long as they are not subjected to excessive shear. Mere passage of the liquid through a conduit, even at a high flow rate so that the fluid is in turbulent flow, is not particularly determental. However in flowing liquids through conduits it is necessary to provide some means of moving the liquids. Thus the liquids are passed through pumps. If the conduit is an elongated one, such as a pipeline, the liquid may pass through a plurality of pumps between its point of origin and its destination. It has been the experience that friction loss control additives tend to degrade, i.e. partially lose their effectiveness, when exposed to shear stress, such as passing through a pump. The reason for this degradation is not entirely clear, but it has been postulated that the friction loss control additives exist in the liquid as long chain aggregates which are broken up by the shearing action of a pump. This altered additive is generally less effective in controlling friction loss than the original material.

It is an object of this invention to provide a liquid composition having reduced friction loss when passed through conduits, which composition has decreased shear degradation. It is another object to provide such a liquid composition which can be passed through a pump without excessive shear degradation. It is a further object to provide a low friction loss liquid which retains a substantial portion of its low friction loss properties when passed through a pump. It is a still further object to provide such a composition for use in pipelines. Other objects, advantages and features will become apparent from the following description and appended claims.

BRIEF SUMMARY OF THE INVENTION

The instant invention involves a low friction loss liquid composition which retains its low friction loss properties when subjected to shear forces comprising an aqueous or oil base liquid and a suitable friction loss control additive for such liquid such friction loss control additive being present at least partially in chunk or granular form.

DESCRIPTION OF THE PREFERRED EMBODIMENT

The liquids which are transported or transmitted through the conduit may be either aqueous-based or oil-based. Examples of aqueous-based liquids include water, brine, gels, acid solutions and the like. Examples of oil-based liquids include oleaginous or petroliferous liquids as well as emulsions, suspensions and dispersions thereof, more particularly crude oil, refined petroleum products such as kerosene, pale oil, diesel oil, fuel oil and asphalt and derivatives of such petroleum products. Where the liquid is a hydraulic fracturing fluid for subterranean well formations, such liquid may also contain solid particulate matter inert to the system, such as sand, as a propping agent, a fluid loss control additive and other materials commonly added to fracturing fluids. Where the liquid is being transported from a point of origin to some destination through a pipeline, the liquid may contain solids inert to the system such as coal or ore which is being transported.

The known friction reducing agents are generally solids which are soluble, often slowly soluble, in the liquid being transported. One of the problems recognized and dealt with in the past was dissolving the friction reducing agent in the liquid in a reasonable length of time. Since dissolution is often slow, it has been the practice to dissolve a relatively large amount of the friction reducing agent in a relatively small volume of a suitable solvent to form a concentrated solution. The concentrated solution is then added to the body of liquid being transported.

The problem confronting the instant inventors was a decrease in effectiveness of the friction reducing additive after the liquid containing the same had been subjected to shear force, such as by being passed through a pump. This decrease in effectiveness occurs with most if not all friction reducing additives which are dissolved or uniformly dispersed in the main body of liquid. The inventors prepared a system in which at least a portion of the friction loss additive was not dissolved in the liquid being transported but rather added thereto in relatively large chunks or granules. The resulting mixture was then pumped through a conduit at high flow rate. It was found that in such a system the portion of the friction reducing agent added in chunk form retained its effectiveness after having passed through the pump. One explanation of this phenomenon is that the slowly-dissolving friction reducing agent passes through the pump at least partially in chunks or granules. Then downstream of the pump these chunks or granules continue to dissolve or disperse supplying the liquid with non-degraded friction reducing additive.

The following friction reducing additives were used as examples of typical species:

FRA-1 (for use in oil) — Polyisobutylene having a weight average molecular weight of $5.2 = 10^6$ FRA-2 (for use in oil) — Copolymer of ethylene and propylene containing 49 mole percent ethylene - having a reduced specific viscosity, 0.2 gram in 100 ml decalin at 135°C of 16.2, and a molecular weight estimated from the reduced specific viscosity of more than $10^6$.

FRA-3 (for use in aqueous media) — Polyacrylamide polymer 30% hydrolyzed by reaction with sodium hydroxide and having a molecular weight such that a 0.5 weight percent solution of the polymer in a 4 weight percent aqueous sodium chloride solution has a viscosity measured on an Ostwald viscometer of 35 centipoises at 25°C.

FRA-4 (for use in aqueous media) — Guar gum.

A pipe viscometer apparatus was used to determine the effect on friction loss of the form in which friction reducing additives are added to liquid media. This apparatus consisted of a 20 foot long section of 0.305 inch inside diameter tubing. The tubing was in the form of a near loop so that both ends thereof could be positioned in a 5 gallon bucket. A 1½ horsepower Ingersoll-Rand 3,455 r.p.m, ¾ MCS size, 20 gallon per minute centrifugal pump was positioned in the tubing near one end of the test loop. A first pressure gauge ranging from 30 ounces per square inch to 30 pounds per square inch pressure was positioned along the tubing five feet from the discharge end of the pump. A second similar pressure gauge was positioned 10 feet farther downstream from the first pressure gauge. Four gallons liquid medium plus a minor amount of friction reducing additive was used. A flow rate of approximately 7 gallons per minute was established through the apparatus. A velocity of 30.5 feet per second and a Reynolds number of approximately 20,000 resulted when diesel oil was used as the liquid medium. Measurements were carried out by adding 4 gallons liquid media to the 5 gallon bucket, starting the pump to circulate the same through the tubing, observing the difference in pressure (pressure drop) as shown on the two gauges, adding a friction reducing additive to the 5 gallon bucket and again observing the pressure drop. The percent friction reduction is calculated as follows:

$$\text{Percent friction reduction} = \frac{(\text{pressure drop of liquid medium}) - (\text{pressure drop of friction reducing additive solution})}{(\text{pressure drop of liquid medium})} \times 100$$

Measurements were made after the test fluid had passed through the centrifugal pump one time and again after several passes through the centrifugal pump. Any decrease in friction reduction with time was indicative of degradation of the fraction reduction additive. The results show that when the friction reduction additive is added in particulate form the friction reduction is initially slightly lower than when the additive is first dissolved in some solvent prior to being added to the test solution. However when the additive is used in particulate form a relatively high proportion of the friction reduction is retained after several passes through a pump whereas test solutions containing the pre-dissolved additive showed sharply reduced friction reduction upon similar treatment. Thus use of the additive in particulate form is highly advantageous.

| Friction reduction additive conc. (weight %) | Liquid media which used | Added as | Number of passes through pump | Friction reduction (%) |
|---|---|---|---|---|
| 0.1 FRA-1 | Diesel Oil | 10% solution in diesel oil | 1 | 45 |
| 0.1 FRA-1 | Diesel Oil | 10% solution in diesel oil | 5 | 7 |
| 0.1 FRA-1 | Diesel Oil | 20 mesh* particles | 1 | 40 |
| 0.1 FRA-1 | Diesel Oil | 20 mesh* particles | 5 | 32 |
| 0.1 FRA-2 | Diesel Oil | 10% solution in diesel oil | 1 | 53 |
| 0.1 FRA-2 | Diesel Oil | 10% solution in diesel oil | 5 | 9 |
| 0.1 FRA-2 | Diesel Oil | 20 mesh* particles | 1 | 50 |
| 0.1 FRA-2 | Diesel Oil | 20 mesh* particles | 5 | 39 |
| 0.1 FRA-3 | Water | 10% solution in water | 1 | 35 |
| 0.1 FRA-3 | Water | 10% solution in water | 5 | 4 |
| 0.1 FRA-3 | Water | 20 mesh* particles | 1 | 33 |
| 0.1 FRA-3 | Water | 20 mesh* particles | 5 | 25 |
| 0.1 FRA-4 | Water | 10% solution in water | 1 | 67 |
| 0.1 FRA-4 | Water | 10% solution in water | 5 | 11 |
| 0.1 FRA-4 | Water | 20 mesh* particles | 1 | 55 |
| 0.1 FRA-4 | Water | 20 mesh* particles | 5 | 42 |

*U.S. Standard Seive Series.

The particle size in which the friction reducing additive is used depends on its rate of solubility in the liquid to which it is added. The lower limit is the minimum size which will still be present in particulate form when the system passes through the first pump downstream of the point of introducing the additive. Thus particles will pass through the pump and continue to dissolve downstream thereof. The upper limit is governed by economics and the ability of the pump to handle large particles.

Broadly the particles size can range from 5 to 300 mesh, U.S. Standard Seive Series. It is difficult for many pumps to handle solutions containing particles larger than about 5 mesh. If less than 300 mesh particles are employed, even of additives which are relatively slowly soluble in the liquid medium, the decrease in friction loss reduction is still pronounced upon passing through a pump. A preferred particle size range is from 10 to 100 mesh.

When using the friction reducing additive in particulate form, there must be an effective amount of additive dissolved or intimately dispersed in a liquid friction reducing-form throughout the time period of transportation of the base fluid being pumped through the conduit. When this time period is extended, such as in a long pipeline, it is often convenient to use the friction reducing additive in a varying particle size range. Thus the smaller particles tend to dissolve or disperse more rapidly providing friction reducing properties immediately after mixing the friction reducing additive and the base fluid. The larger particles tend to dissolve slowly and disperse completely at a later time providing friction reducing properties for at a substantial time after mixing. Thus a more or less even release of additive to the base fluid is achieved throughout the time period of transportation. A preferred friction reducing additive of varying particle size is one having at least 20 percent (by weight) of the particles with a size range of from 5 to 30 mesh, at least 20 percent of the particles with a size range of from 40 to 90 mesh and at least 20 percent of the particles with a size range of from 100 to 200 mesh. The remaining percentage necessary to constitute 100 percent may be of any particle size within the range of from 5 to 300 mesh.

We claim:

1. In the process of passing at a high flow rate through a pump in a transportation system comprising one or more pumps and one or more conduits connected thereto of a mixture of a liquid and a friction loss reducing additive, which is slowly soluble in said liquid, the improvement of maintaining the friction loss reducing additive at least partially in the form of solid particles having a size range of from 5 to 300 mesh during the passage of said mixture through the pump to reduce the shear degradation of said friction loss reducing additive.

2. The process of claim 1 wherein the friction reducing agent is utilized in a varying particle size in the range wherein at least 20 percent by weight of the particles have a size range of from 5 to 30 mesh, at least 20 percent of the particles have a size range of from 40 to 90 mesh, at least 20 percent of the particles have a size range of from 100 to 200 mesh and the remaining particles have a size range of from 5 to 300 mesh.

3. The process of claim 1 wherein the conduit comprises a pipeline.

4. The process of claim 1 wherein the conduit comprises oil well tubing.

5. In the process of hydraulically fracturing an earth formation penetrated by a well wherein a liquid fracturing fluid is passed through a pump, down the well and into the earth formation at a high velocity to fracture the earth formation, the improvement of decreasing the friction loss in the flow of the liquid fracturing fluid which comprises passing through the pump a mixture of a liquid fracturing fluid and a friction loss reducing additive which is slowly soluble in said liquid and at least partially in the form of solid particles having a size range of from 5 to 300 mesh during the passage of said mixture through the pump to reduce the shear degradation of said friction loss reducing additive.

* * * * *